R. F. ROSS.
NUT LOCK.
APPLICATION FILED NOV. 9, 1907.
922,721.
Patented May 25, 1909.
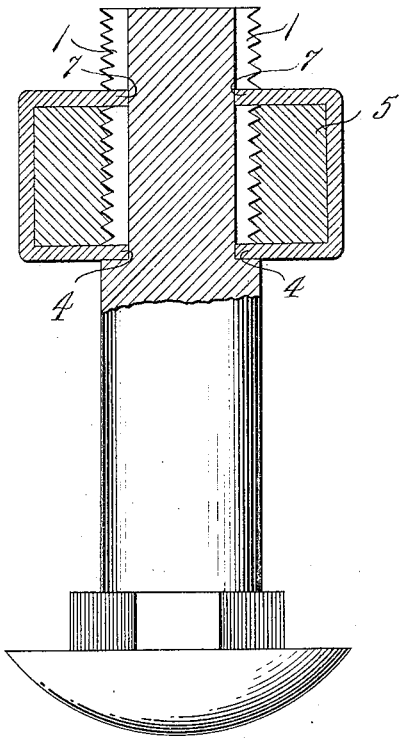
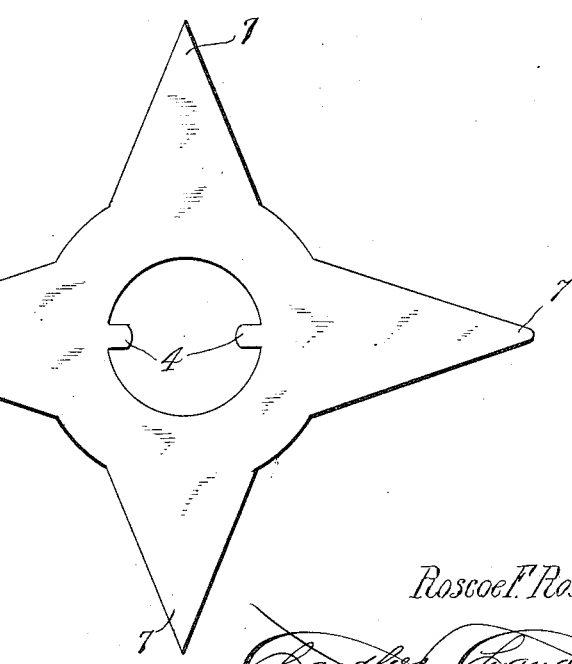
Witnesses
J. H. Crawford
John A. Megay
Inventor
Roscoe F. Ross,
By Chandler & Chandler
Attorneys

UNITED STATES PATENT OFFICE.

ROSCOE F. ROSS, OF BIGGSVILLE, ILLINOIS.

NUT-LOCK.

No. 922,721.　　Specification of Letters Patent.　　Patented May 25, 1909.

Application filed November 9, 1907. Serial No. 401,484.

*To all whom it may concern:*

Be it known that I, ROSCOE F. ROSS, a citizen of the United States, residing at Biggsville, in the county of Henderson, State of Illinois, have invented certain new and useful Improvements in Nut-Locks; and I do hereby declare the following to be a full, clear, and exact description of the invention, such as will enable others skilled in the art to which it appertains to make and use the same.

This invention relates to nut locks, and more particularly to the class that employ a thin plate, commonly termed a washer, which is provided with tongues or projections to engage suitable channels formed in the threaded portion of the bolt, in order to lock the latter and the nut together, so that the cumulative jarring of machinery or railway cars will not loosen them or affect their efficiency.

In the accompanying drawings forming a part of this specification Figure 1 is a view of the device partly in section, showing the parts locked. Fig. 2 is a plan view of the locking washer.

Similar numerals of reference are employed to designate corresponding parts throughout.

In carrying out the invention, I form in a bolt of ordinary make, oppositely arranged and longitudinally extending channels, the walls of which are smooth, these channels or grooves extend through the threaded portion of the bolt and are adapted to receive the lugs of a locking washer. The latter, which is made to cover the bottom or inner side of the nut 5, is in the form of a multi-pointed star, having four clenching portions 7 radiating from the outer side of its body portion. Projecting inwardly from opposite sides of the opening of the washer, are the locking lugs 4 which fit in a snug manner in the said grooves 1 of the bolt. The clenching portions of the washer that aline with the tongues 4 have a length sufficient to permit their extremities to be forced through the bolt grooves 1, it being understood that the washer has first been slipped on the end of the bolt, with the tongues 4 extending in the grooves 1, after which the clenching portions 7 are turned upward against the faces of the nut, and as before stated, the clenching portions that aline with the tongues 4 are then bent to enter into the bolt channels 1. The other projections are somewhat less in length and are designed to be bent upwardly so as to bear on the opposite outer faces of the nut.

With this construction it can be readily seen that the washer will lock the bolt and nut together rigidly and most securely, and when it is desired to release the parts it will be necessary to bend back the clenching portions bearing against the opposite faces of the nut, and then with a suitable tool to pry out the extremities of other clenching portions projected into the grooves 1.

What is claimed is—

In a device of the class described, the combination with a bolt having oppositely arranged channels in its threaded portion, all of the walls of which are smooth, of a nut engaging the threaded portion, a plate disposed against the inner side of the nut and provided in its bolt opening with inwardly projecting lugs that project into the channels and formed at its periphery with two pairs of oppositely alined pointed arms, two of which are arranged to be bent around two opposite sides of the nut with their terminals bearing upon the outer face of the nut, the other two being arranged to be bent around the sides of the nut and against the outer face thereof and to have their terminals project into the bolt channels.

In testimony whereof, I affix my signature, in presence of two witnesses.

ROSCOE F. ROSS.

Witnesses:
W. C. IVINS,
H. O. BIRDSALL.